US011915725B2

(12) United States Patent
Isberg (10) Patent No.: US 11,915,725 B2
(45) Date of Patent: Feb. 27, 2024

(54) POST-PROCESSING OF AUDIO RECORDINGS

(71) Applicant: Sony Group Corporation, Tokyo (JP)

(72) Inventor: Peter Isberg, Lund (SE)

(73) Assignee: Sony Group Corporation, Tokyo (JP)

( * ) Notice: Subject to any disclaimer, the term of this patent is extended or adjusted under 35 U.S.C. 154(b) by 283 days.

(21) Appl. No.: 17/441,190

(22) PCT Filed: Mar. 20, 2019

(86) PCT No.: PCT/EP2019/056945
§ 371 (c)(1),
(2) Date: Sep. 20, 2021

(87) PCT Pub. No.: WO2020/187408
PCT Pub. Date: Sep. 24, 2020

(65) Prior Publication Data
US 2022/0172744 A1    Jun. 2, 2022

(51) Int. Cl.
*H04B 1/00*    (2006.01)
*G11B 27/031*    (2006.01)
*G10H 1/36*    (2006.01)

(52) U.S. Cl.
CPC ........... *G11B 27/031* (2013.01); *G10H 1/366* (2013.01); *G10H 2210/155* (2013.01); *G10H 2240/016* (2013.01)

(58) Field of Classification Search
CPC .............................. G11B 27/031; G10H 1/366
See application file for complete search history.

(56) References Cited

U.S. PATENT DOCUMENTS

| 7,394,519 B1* | 7/2008 | Mossman | ........ G11B 20/00891 352/85 |
| 9,332,341 B2 | 5/2016 | Okabayashi | |
| 9,934,772 B1 | 4/2018 | Yoelin | |
| 2011/0093101 A1* | 4/2011 | Casagrande | .......... G06F 16/639 705/26.1 |
| 2015/0074698 A1* | 3/2015 | Pinto | .................. H04N 21/6582 725/14 |

(Continued)

FOREIGN PATENT DOCUMENTS

| EP | 0 668 583 A1 | 8/1995 | |
| FR | 0668583 A1 * | 8/1995 | ............. G10K 15/02 |

OTHER PUBLICATIONS

International Search Report and Written Opinion for corresponding International Application No. PCT/EP2019/056945 dated Nov. 25, 2019.

(Continued)

*Primary Examiner* — Simon King
(74) *Attorney, Agent, or Firm* — Renner, Otto, Boisselle & Sklar, LLP (57) ABSTRACT

A method of post-processing an audio recording in an audio production equipment (101) includes receiving at least one audio track (91) of the audio recording, analyzing one or more characteristics (80) of the at least one audio track (91) to identify a timing of one or more points of interest (251-254) of a content (201-203, 269) of the at least one audio track (91), and adding, to the audio recording and at the timing of the one or more points of interest (251-254), one or more audience reaction effects (261-264).

16 Claims, 5 Drawing Sheets

(56) References Cited

U.S. PATENT DOCUMENTS

2016/0006981 A1\* 1/2016 Bauman ............. H04N 21/4788
  348/14.03
2016/0227277 A1\* 8/2016 Schlesinger ..... H04N 21/44218
2018/0322482 A1 11/2018 Rivera et al.
2019/0206399 A1\* 7/2019 Garmark ................. G11B 27/11

OTHER PUBLICATIONS

Dave Hoskins, "Crowd Chamber User Guide," Quick Quak Audio plug ins, vol. 2, 2005-2011.
Bruce Bartlett, "Drum Solo," Practical Recording Techniques, 7th Edition, 2011, pp. 1-20.

\* cited by examiner

POST-PROCESSING OF AUDIO RECORDINGS

This application is a national phase of International Application No. PCT/EP2019/056945 filed Mar. 20, 2019, the entire disclosure of which is hereby incorporated by reference.

TECHNICAL FIELD

Various examples of the invention generally relate to post-processing of audio recordings in an audio production equipment. Various examples of the invention specifically relate to adding one or more audience reaction effects to the audio recording.

BACKGROUND

An audio recording typically includes multiple tracks. For example, different tracks can be associated with different audio sources. Sometimes, it can be desirable to add audience reaction effects to the audio recording. A reason to do so can be to enhance the quality of the content of the audio recording, e.g., of a concert or of a live performance.

Existing techniques of adding audience reaction effects require manual analysis of the audio recording to add audience reaction effects at the appropriate points of interest. This can be a cumbersome and sometimes error-prone process, in particular for inexperienced users. The process can be time-consuming.

SUMMARY

Therefore, a need exists for advanced techniques of post-processing an audio recording. Specifically, a need exists for advanced techniques which overcome or mitigate at least some of the above-identified restrictions and drawbacks.

This need is met by the features of the independent claims. The features of the dependent claims define embodiments.

According to an example, a method of post-processing an audio recording in an audio production equipment includes receiving at least one audio track of the audio recording. The method also includes analyzing one or more characteristics of the at least one audio track to identify a timing of one or more points of interest of a content of the at least one audio track. The method also includes adding one or more audience reaction effects to the audio recording. The one or more audience reaction effects are added at the timing of the one or more points of interest.

A computer program or a computer-program product or a computer-readable storage medium includes program code. The program code can be loaded by at least one processor. The at least one processor can execute the program code. When executing the program code, the at least one processor is configured to perform a method of post-processing an audio recording in an audio production equipment. The method includes receiving at least one audio track of the audio recording, analyzing one or more characteristics of the at least one audio track to identify a timing of one or more points of interest of a content of the at least one audio track, and adding, to the audio recording and at the timing of the one or more points of interest, one or more audience reaction effects.

An audio production equipment includes at least one processor and a memory. The at least one processor is configured to load, from the memory, program code. The at least one processor is configured to execute the program code. Upon executing the program code, the at least one processor is configured to receive at least one audio track of an audio recording; and to analyze one or more characteristics of the at least one audio track to identify a timing of one or more points of interest of a continent of the at least one audio track; and to add to the audio recording and at the timing of the one or more points of interest, one or more audience reaction effects.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of post-processing an audio recording are described. The audio recording can include multiple audio tracks. Different audio tracks may include different content. For example, different audio tracks of the audio recording may be associated with different audio sources. For example, microphones used for recording the different audio tracks can be placed at different positions in an auditorium or with respect to the music performer.

As a general rule, the subject applications can be applied to audio recordings having varying content. Example content may include: content related to a live performance; content related to a concert; content related to a studio recording; etc.

Techniques described herein facilitate efficient adding of one or more audience reaction effects. The one or more audience reaction effects may be added in an automated manner.

Audience reaction effects may generally describe audio content associated with sound made by an audience, i.e., a large group of people. The audience reaction effects may be selected from the group comprising: cheering; whistling; stadium ambience; club ambience; and applause.

Such techniques are based on the finding that sometimes it can be desirable that bands can record performances at any venue and then create credible mixes of the audio recording giving the impression of a live performance, by adding the one or more audience reaction effects. For example, nowadays, it is easy for artists to obtain a complete concert recording with separate audio tracks for every recording channel from a mixing console as audio production equipment. Modern mixing consoles can deliver all channels on, e.g., an ethernet cable. Example formats include e.g., Dante or MADI. The audio recording can be stored on a storage medium such as a USB hard drive. As a general rule, a typical number of audio tracks of an audio recording is 32 or 64 or even 128. For example, multiple microphones may be placed across the venue and each microphone may provide a corresponding audio track. It has been observed that the quality of the content of the audio recording often is influenced by the quality with which the audience reaction can be recorded. For example, it can sometimes be desirable that the listener obtains a sense of the "flesh-and-blood" of the event, including audience reaction such as cheering, clapping, and whistling, etc. However, this can sometimes be difficult to provide for, given certain hardware constraints. For example, to adequately record the audience reaction, it can sometimes be required to place a significant count of microphones across the auditorium. Typically, the count of microphones required to adequately capture the audience reaction can scale with the size of the audience. It has been observed that, if the number of microphones configured and arranged to record the audience reaction is insufficient, the content of the audio recording can be altered in an undesirable manner. For example, a listener may obtain the impression that the audience was in fact smaller than the actual audience. Audience reaction by individuals close to the microphones may be overemphasized, e.g., individual voices or claps may be over-emphasized in the audio recording. Further, sometimes it can be desirable to even enhance the audience reaction effects. This can be motivated by the desire to provide a "larger-than-life" listening experience. This means that the artist or producer might want the audience to appear to be even more enthusiastic than they actually were, or sound as if there were many more people.

According to various examples described herein, automated techniques of post-processing are provided for which allow to add one or more audience reaction effects to an audio recording. More specifically, it is possible to add the one or more audience reaction effects to the audio recording at the timing of one or more points of interest. The points of interest can be identified by automatically analyzing one or more characteristics of at least one audio track of the audio recording.

Figure 1:
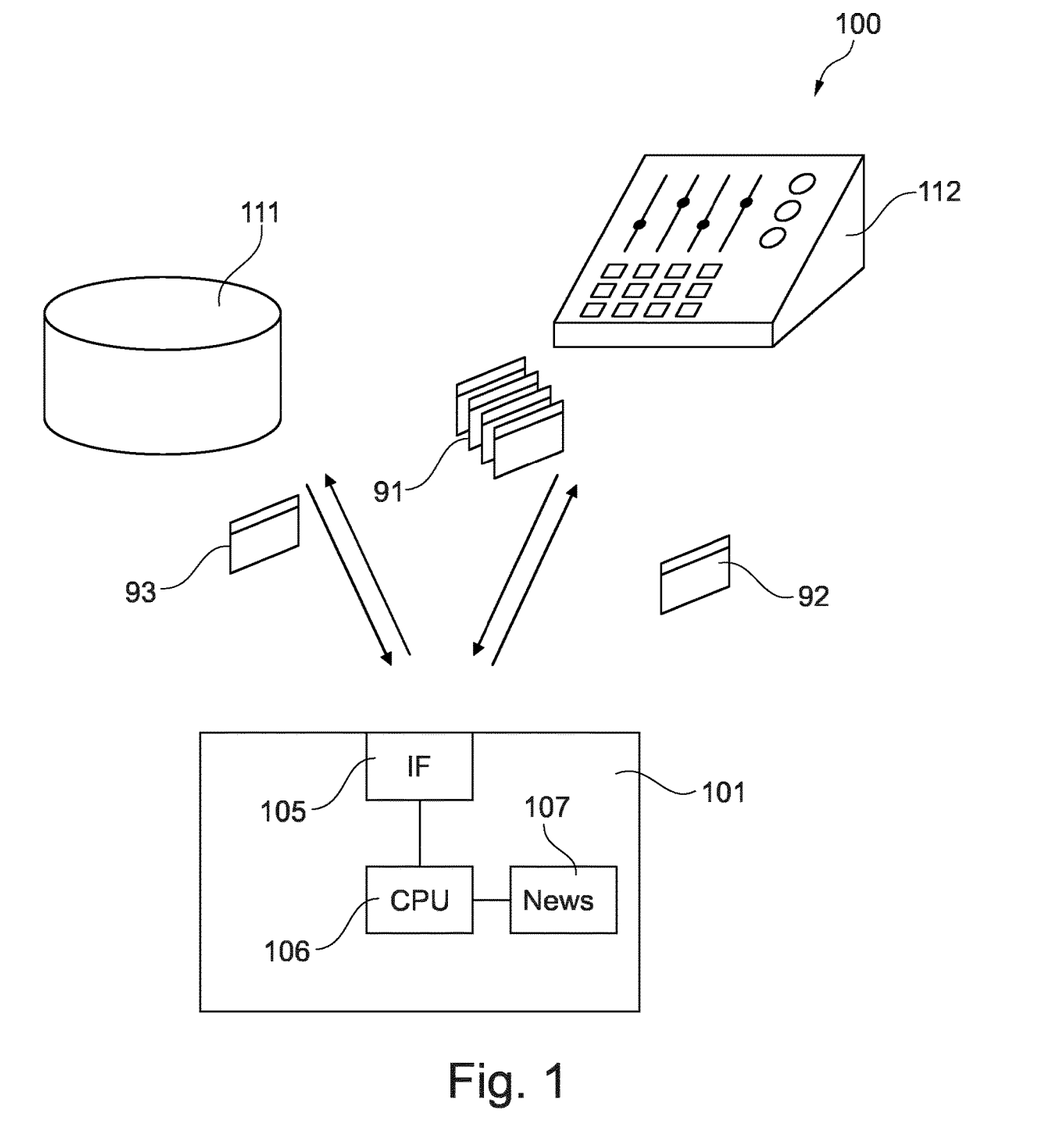
FIG. 1 schematically illustrates a system including a mixing console, a device, and a database according to various examples.

FIG. 1 schematically illustrates a system 100 according to various examples. The system 100 includes a device 101. The device can implement an audio production equipment. The device 101 includes a processor 106 coupled to a memory 107. The device 101 also includes an interface 105. The processor 106 can load a program code from the memory 107 and can then execute the program code. When executing the program code, the processor 106 is configured to perform various techniques as described herein regarding: receiving, via the interface 105 and from an audio mixing console 112, one or more audio tracks 91 of an audio recording; analyzing one or more characteristics of the at least one audio track 91; identifying a timing of one or more points of interest of a content of the one or more audio tracks 91, based on such analysis; adding one or more audience reaction effects to the audio recording, e.g., as a further audio track 92; loading at least a part of the one or more audience reaction effects as pre-prepared control data 93 from a database 111; generating one or more of the one or more audience reaction effects, e.g., using an algorithm; etc.

While in FIG. 1, the device 101 and the mixing console 112 are shown as separate entities, in some examples, it would be possible that the device 101 and the mixing console 112 are implemented as a single entity.

Details with respect to the functioning of the system 100 and, in particular, the device 101 are described next in connection with the flowchart of FIG. 2.

Figure 2:
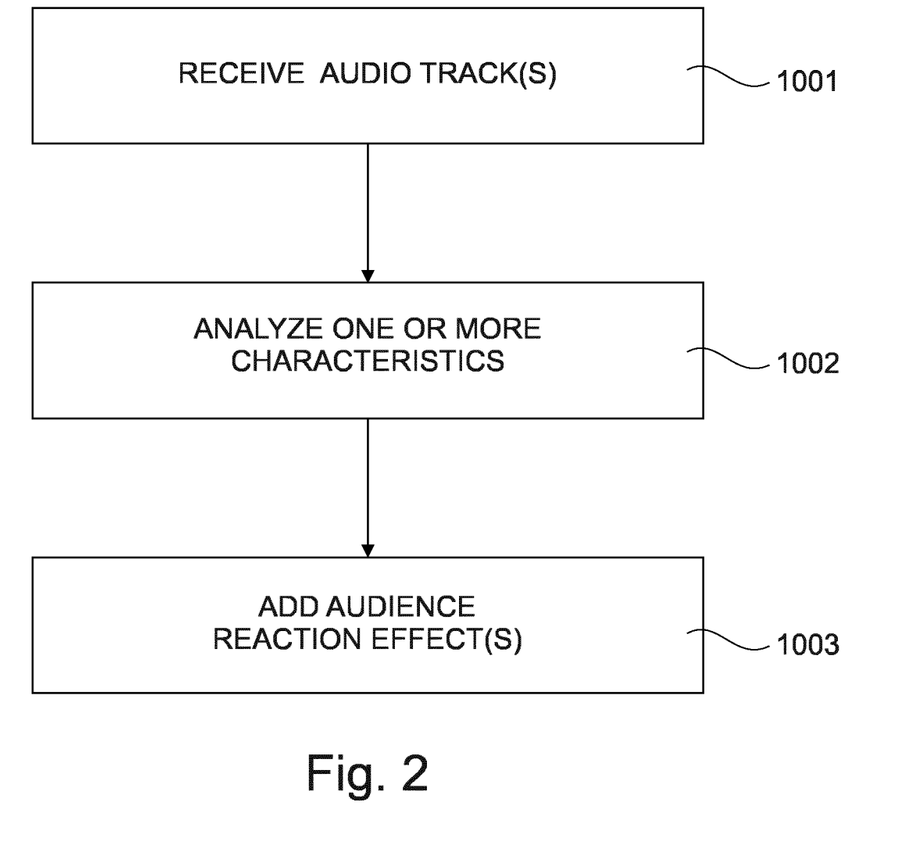
FIG. 2 is a flowchart of a method according to various examples.

FIG. 2 is a flowchart of a method according to various examples. For example, the method of FIG. 2 may be executed by a processor uploading program code from a memory. For example, the method according to FIG. 2 may be executed by the processor 106 of the device 101 of the system 100 according to the example of FIG. 1. Hereinafter, corresponding examples will be described with respect to such an implementation in which the processor 106 of the device 101 executes the method; but similar techniques may be readily applied to implementations in which another processor executes the method.

Initially, at block 1001, the processor 106 receives, via the interface 105, one or more audio tracks. According to various examples, it would be possible that at least one of the received audio tracks includes a sum of multiple audio sources. In some examples, there may be initially more audio tracks that are then mixed together, to obtain a smaller count of audio tracks; this smaller count of audio tracks is then received in block 1001. Such a technique facilitate efficient processing, because the amount of data can be reduced. Also, compatibility with existing audio production systems can be ensured and such configuration may be easy and fast to set up for the mix engineer.

For example, it would be possible that the processor 106 receives the one or more audio tracks 91 from the database 111. Such a scenario can relate to a studio post-processing, or offline post-processing. Alternatively, it would also be possible that the processor 106 receives the one or more audio tracks 91 from the mixing console 112, e.g., in a live post-processing scenario. In particular, in such a scenario, it would be possible that the post-processing, as will be explained hereinafter with respect to boxes 1002 and 1003, is performed in real-time. Performing the post-processing in real-time can correspond to: performing the post-processing with a time delay that is essentially below a human-recognizable time delay. Typical time delays may hence be smaller than, e.g., 100 milliseconds.

Next, at box 1002, one or more characteristics of the one or more audio tracks, as received in box 1001, are analyzed. This is done to identify a timing of one or more points of interest of a content of the one or more audio tracks.

In further detail, it would be possible to analyze one or more characteristics of the at least one audio track that are indicative of dynamics of the content of the one or more audio tracks.

As a general rule, various options exist for implementing box 1002. Specifically, various options exist for characteristics that are analyzed. To give a few examples, the characteristics that are analyzed in box 1002 could be selected from the group comprising: contrast in audio level of the one or more audio tracks; contrast in spectral distribution of the one or more audio tracks; contrast in musical intensity of the content of the at least one audio track; contrast in musical tempo of the content of the one or more audio tracks; and key changes of the content of the one or more audio tracks.

The musical intensity can correlate with human perception of the music. For example, an electronic bass at, e.g., more than 80 beats per minute, can create the perception of strong music intensity, e.g., if compared to a long consonant chord—even if the audio level is approximately the same. On the other hand, audio level may be purely objectively defined, e.g., as the maximum or root-mean-square amplitude within a certain timeframe. Musical tempo can likewise correlate with the human perception of the music. For example, the perceived musical tempo may be influenced by how many beats in a measure that are emphasized.

As will be appreciated from the above, as a general rule, the characteristics can relate to non-hidden or hidden observables associated with the one or more audio tracks. For example, the audio level and the spectral distribution of the audio track can be directly measured, e.g., using an amplitude analysis or a Fourier transform; hence, they may be labeled as observable variables. A-priori knowledge or predefined assumptions, e.g., a model of human perception or the like, may be required to interpret the at least one audio track to derive information on the content of the at least one audio track. Further, application-level information may be required to do such an analysis, taking into account human-understandable information such as the contrast of the musical intensity, the contrast in the musical tempo, or the key changes.

Furthermore, along with the wide variation of possible characteristics of the one or more audio tracks that is subject to the analysis, also the techniques used to implement the analysis can vary from implementation to implementation. For instance, to obtain the contrast in audio level or the contrast in spectral distribution, it would be possible to employ a sliding-window process using a level analysis (e.g., a multi-threshold comparison) and performing a derivation of the audio level along the windows of the sliding-window process. Also, to determine the contrast in the spectral distribution, a sliding-window process can be employed and a Fourier Transform, e.g., a Fast Fourier Transform, can be implemented for each one of the windows of the sliding-window process. Then, differences in the thereby determined spectral distribution arising between different windows of the sliding-window process (derivation) can be used to determine the respective contrast.

Even if no specific microphones for recording the crowd were used during a live performance recording, sounds from the audience may still leak into some microphones being used. I.e., all microphones may be arranged adjacent to the stage and artist(s), rather than adjacent to the audience or auditorium. An algorithm could be used to find such audience reactions among the recorded tracks. One possibility is that a source separation algorithm is used to separate the different components in an audio track, to isolate the audience reactions and, from this, determine the points of interest. Then, based on the points of interest it would be possible to further augment the audience reaction with techniques described herein, i.e., by adding one or more audience reaction effects.

As a general rule, a machine-learning algorithm—e.g., an artificial neural network or a support-vector machine—may be used to implement the analysis. For example, such an algorithm can be trained based on training data that is available during a training phase, e.g., based on expert knowledge. For example, an expert can annotate training audio tracks to identify the points of interest.

According to various examples, it would be possible that such automated analysis is complemented by user-triggered control data. Thus, as a general rule, it would be possible that in box 1002 the timing of the one or more points of interest is further identified based on a user-input received via a human machine interface (HMI). As a further general rule, the user-input may also be used to determine at least one property of the audience reaction effects—e.g., their intensity and/or type and/or duration.

Based on such techniques of analyzing one or more characteristics of the at least one audio track (and, optionally, user-input received via an HMI), one or more points of interest, having a specific timing, are identified. As mentioned above, these one or more points of interest correspond to sections of increased dynamics of the content of the one or more audio tracks. Such techniques are based on the finding that, typically, audience reaction can be expected where the content of the one or more audio tracks include increased dynamics. Such transition periods—e.g., in between different songs; at the beginning or the end of a solo performance; and sections where artist-crowd interaction takes place—are thus possible implementations of the one or more points of interest.

Next, at box 1003, audience reaction effects are added to the audio recording. For instance, the one or more audience reaction effects could be added by summing onto at least one of the one or more audio tracks received as part of box 1001. It would also be possible that the one or more audience reaction effects are added to a newly-generated audio track of the audio recording.

In box 1003, one or more audience reaction effects are added to the audio recording, in particular at the timing of the one or more points of interest as identified in box 1002. These audience reaction effects thus artificially enhance or provide the impression of an audience reaction.

As a general rule, various options are available for implementing box 1003. In one implementation, it would be possible that at least a part of the one or more audience reaction effects is loaded from the database 111, i.e., as the control data 93 (cf. FIG. 1). In other words, the one or more audience reaction effects may be pre-prepared. For example, the one or more audience reaction effects could be studio recorded. It would also be possible that the one or more audience reaction effects are synthesized.

In a further option for implementing box 1003, it would be possible that the one or more audience reaction effects are synthesized on-line, i.e., when executing box 1003 and after executing block 1002. Such a scenario facilitates a dynamic configuration of the one or more of audience reaction effects, e.g., depending on the content of the audio recording. To give an example, it would be possible that at least one property of the audience reaction effects—e.g., their intensity and/or type and/or duration—is determined based on the at least one track of the audio recording. More specifically, the audience reaction effect can be synthesized, i.e., generated, based on the native audience reaction.

In a specific example, it would be possible that a first intensity of an audience reaction of the content of the audio track is detected, i.e., the first intensity corresponds to the native intensity of the audience reaction as recorded. Then, it would be possible that the one or more audience reaction effects are added to the audio recording. The one or more audience reaction effects can have a second intensity and the second intensity can be larger than the first intensity. Thus, in other words, the native audience reaction as included in the audio recording can be emphasized/amplified.

As a general rule, there are also other options available for synthesizing the audience reaction effect, as part of box 1003. To give an example, it would be possible that at least one of a pitch detection and a fricative detection is performed on vocals of the content of the one or more audio tracks. Then, crowd singing can be generated, in accordance with the at least one of the pitch detection and the fricative detection, to thereby obtain the one or more audience reaction effects.

According to some examples, it would also be possible that the adding of the one or more audience reaction effects, in box 1003, is, at least partly, dependent on a user input. For example, it would be possible that control data is received via a human-machine-interface (HMI). The control data can be associated with the one or more audience reaction effects. Then, the one or more audience reaction effects can be added in accordance with the control data. To give an example, it would be possible that the intensity of the one or more audience reaction effects is specified by the control data. By such an example, it would be possible that the user conveniently configures the intensity of the desired one or more audience reaction effects, e.g., by a slide control of the audio mixing console 112.

Figure 3:
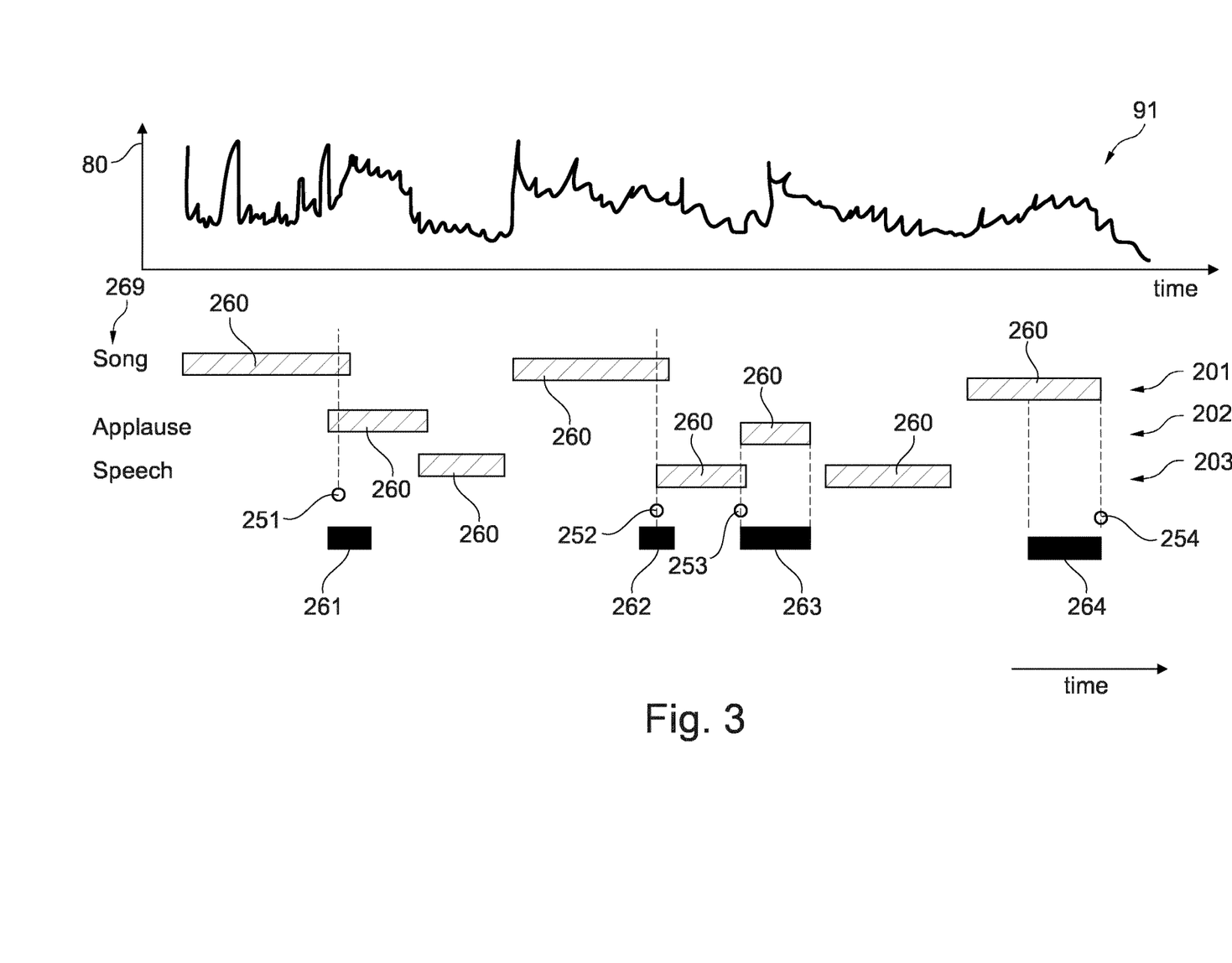
FIG. 3 schematically illustrates an audio track, a content of an audio track, and one or more points of interest associated with the content of the audio track according to various examples.

FIG. 3 schematically illustrates aspects with respect to the one or more audio tracks 91, the content 201-203, 269 of the one or more audio tracks 91 and points of interest 251-254 of the one or more audio tracks 91.

FIG. 3, top, illustrates one of the one or more audio tracks 91. In FIG. 3, top, the audio level 80 of the respective one of the one or more audio tracks 91 is illustrated.

FIG. 3, bottom, illustrates aspects with respect to the content 269 of the respective one of the one or more audio tracks 91. Specifically, the content 269 is classified into song 201; applause 202; and speech 203. The particular time periods 260 during which the respective content 201-203, 269 is encountered is illustrated by the dashed bars in FIG. 3, bottom.

As illustrated in FIG. 3, based on an analysis of one or more characteristics of the respective one of the one or more audio tracks 91, e.g., based on an analysis of the audio level 80, the points of interest 251-254, and specifically, their timing, are identified. For example, the point of interest 251 corresponds to an end of a song 201. This also applies for the point of interest 252. The point of interest 253 corresponds to an end of a speech 203, associated with artist-crowd interaction, because subsequently there is applause 202 present. Also, the point of interest 254 corresponds to end of song 201.

As illustrated in FIG. 3, it is then possible to add, to the audio recording, audience reaction effects 261-264 (illustrated with the black bars in FIG. 3). For instance, the audience reaction effect 261 could correspond to whistling of the audience, partly in parallel to the end of the song 201 and partly in parallel to the applause 202. For example, the audience reaction effect 263 could correspond to an applause having an increased intensity vis-à-vis the applause 202 of the native audience reaction 260. For example, the audience reaction effect 264 could be associated with crowd singing, in accordance with the song 201.

Next, further details with respect to the function of the techniques of post-processing as described above in connection with FIGS. 1-3 will be explained in connection with FIG. 4 and FIG. 5.

Figure 4:
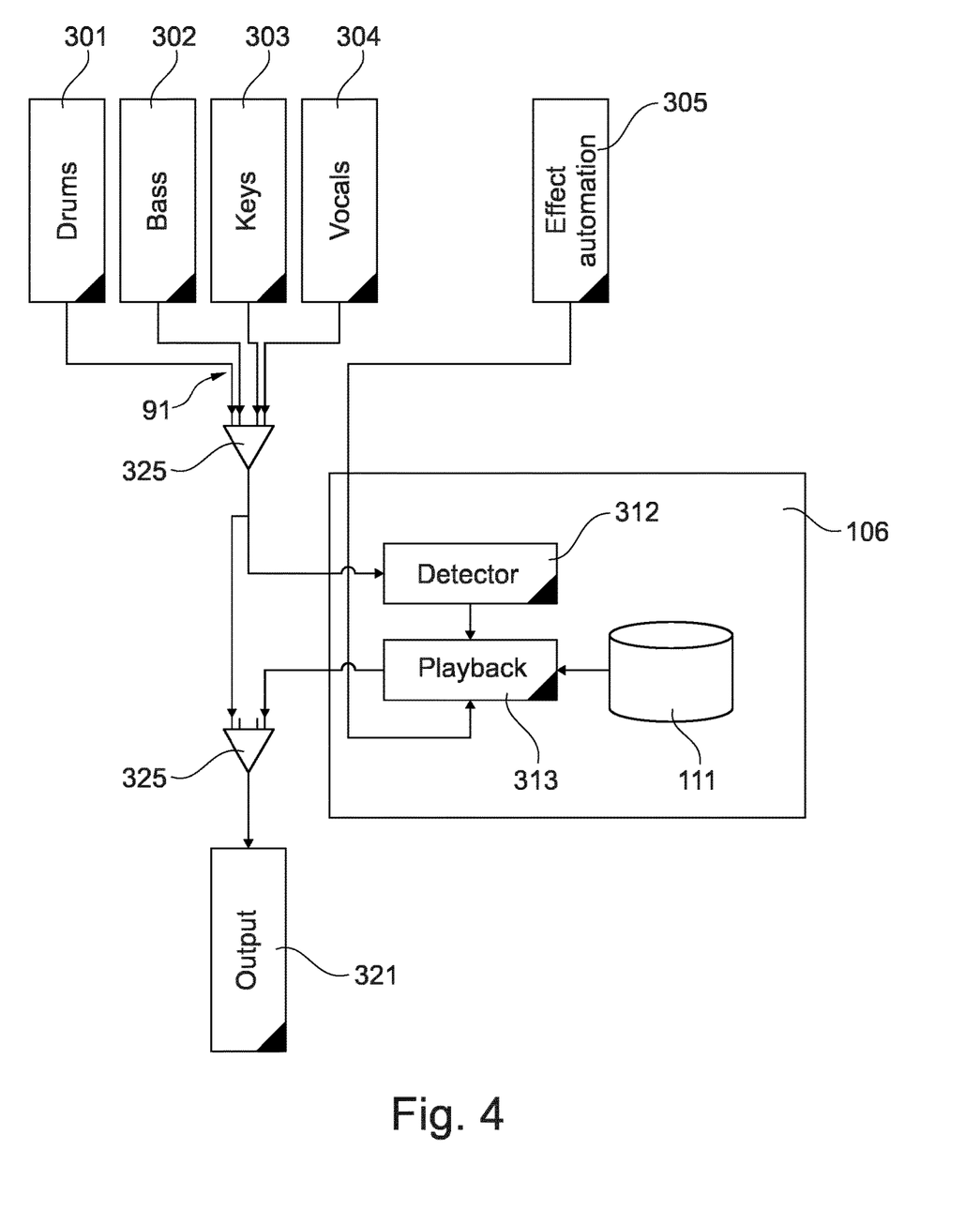
FIG. 4 is a functional diagram of post-processing of an audio recording according to various examples.
Figure 5:
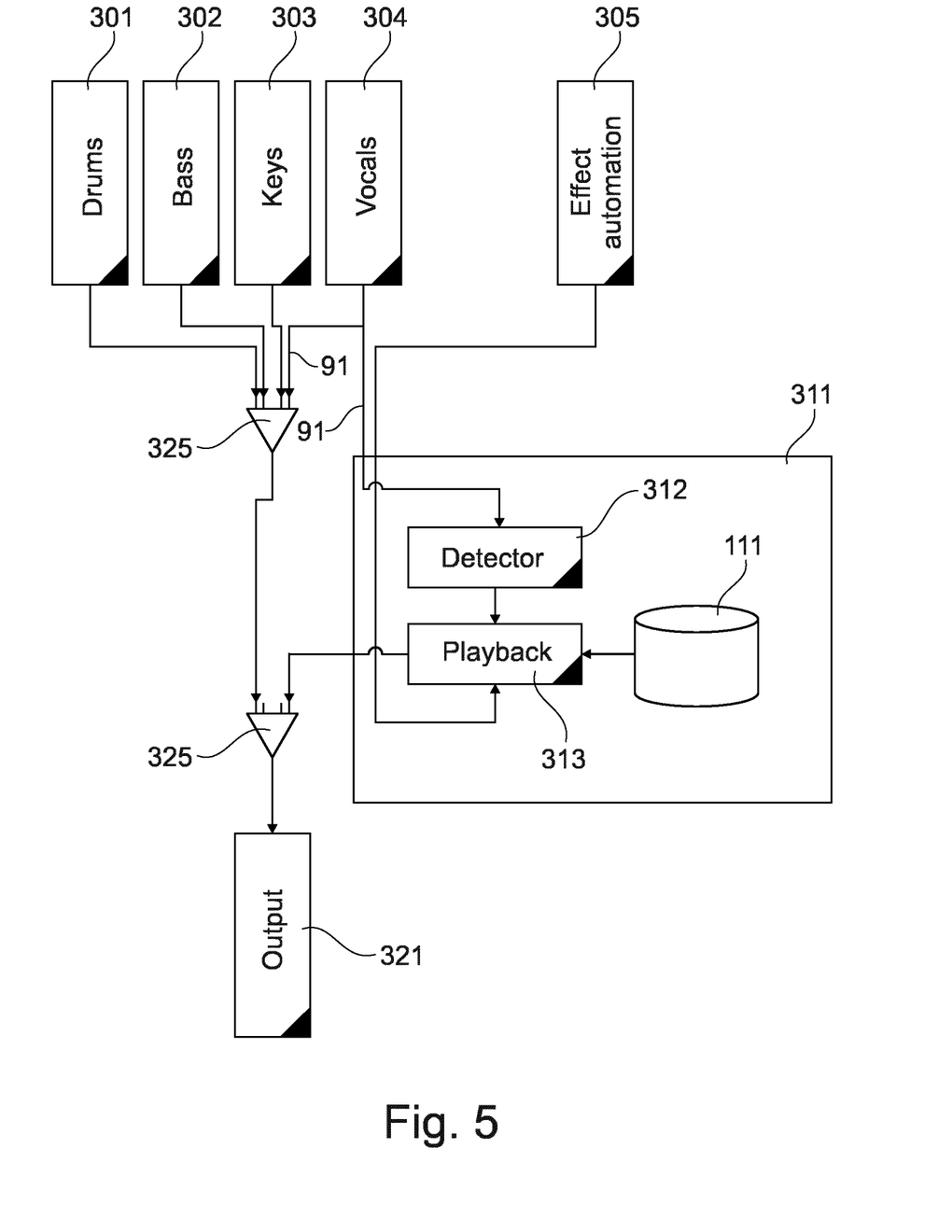
FIG. 5 is a functional diagram of post-processing an audio recording according to various examples.

FIG. 4 is a functional diagram. Illustrated in FIG. 4 is a scenario where multiple audio tracks 91 are received from audio sources 301-304. A summation element 325 mixes these audio tracks and a single audio track is then forwarded to a detector module 312 implemented, e.g., as software and/or hardware, by the processor 106. The detector module 312 could be implemented as a software plugin known as Digital Audio Workstation, DAW. It may be using plugin formats such as VST, AU, RTAS, AAX etc. The plugin has a "sidechain" input which is routed from a suitable "aux" channel, e.g. containing a mix of all audio tracks or a subset. The detector module 312 detects the end of a song—or any other suitable point of interest, such as end of solo—using simple or advanced methods, such as: (i) Level goes from high to low (with appropriate time constants); (ii) Artificial intelligence, trained on many songs, detects end of a song, i.e., machine-learning algorithm; and/or (iii) a "twelvetone" analysis can detect choruses and verses. Examples of the twelvetone analysis are described at https://www.sony-.com.my/electronics/support/articles/S500022406 (retrieved at Mar. 19, 2019). Thus, as will be appreciated, it is possible to detect the points of interest by analyzing characteristics of the one or more audio tracks vs. time, where characteristics is at least one of the following (as measured with suitable averaging times to avoid reacting on too short level changes such as drum hits): (i) Contrast in level; (ii) Contrast in musical intensity; (iii) Contrast in musical tempo; (iv) Key change.

A playback module 313—that may be implemented as a software plugin on the processor 106—adds one or more audience reaction effects such as applause and cheering. It may use a large pool of audience recordings to avoid obvious repetitions and to enable customization for the type of concert. For this, it can be connected to the database 111.

The crowd noise could be "always on" with an increased intensity at the points of interest.

The playback module 313 has automation inputs to receive control data from an HMI 305, so that the mixing engineer can, on top of the automatic function, give triggers to define a point of interest and/or control the general intensity of the audience reaction effect, or any other characteristic of the audience reaction effect. This can be technically accomplished in the DAW by automation parameters to the plugin. On the time line, control of effect parameters is possible, e.g. to change the track volume over time, raise the level of a reverb in the chorus, put delay only on certain words, change a filter gradually etc. In the case of audience reaction effects, such effect automation parameters could be used by the mixing engineer to provide control data to control, e.g., the intensity of the audience reaction effects and boost it at selected positions. This is an optional function, to augment the primary function where the plugin automatically adds the audience reaction effects.

The detector module 312 and the playback module 313 have a "crowd-singing" mode where it gets a sidechain feed from the lead vocal audio track, i.e., audio source 304, and from this generates "crowd-singing" at the same musical notes and with formant tracking, such that the result is "a", "o", "e" etc and the illusion of crowd singing is achieved, as a particular implementation of the generation of an audience reaction effect. In detail, to perform pitch and formant/consonant (fricative) detection on a vocal track, various pitch detection and formant detection schemes exist, e.g. for speech codecs and speech2text.

Pitch detection: https://ccrma.stanford.edu/~pdelac/154/m154paper.htm

Formant detection: https://www.researchgate.net/publication/260830323 Comparison of Formant Detection Methods Used in Speech Processing Applications Vowel and fricatives detection: https://home.cc.umanitoba.ca/~krussll/phonetics/acoustic/spectrogram-sounds.html The sung pitch, formant, fricative is now detected either as "a", "e", "o", "k", "t" or just as a frequency (for pitch) and filter shape (for the formant). Then, based on the detected pitch/formant/fricative etc, it is possible to generate crowd singing, by known methods for sample playback or by known methods for synthesizing human voices. Sample playback: https://soundiron.com/products/olympus-microchoir (currently limited in the vocabulary to only a few words). Synthesizing: http://www.gerritbloothooft.nl/SSC/

Sometimes, delay can occur for this use case, due to the acoustic propagation at the venue. If wanted, it is possible for the plugin to signal its delay to the mixing console 305 so it is compensated for.

While in FIG. 4 a scenario is illustrated in which multiple audio tracks 91—such as drums, bass, keys, vocals etc. are sub-mixed and then that submix signal is sent to the detector module 312 for further analysis, this is generally optional: in other examples, the detector module 312 the plugin could also receive all wanted audio tracks 91 separately. In this regard, reference is made to FIG. 5: the scenario of FIG. 5 generally corresponds to the scenario of FIG. 4. However, in the scenario of FIG. 5, only one of the audio tracks 91—corresponding to the vocals audio source 304—is routed to the detector module 312.

Summarizing, above, techniques have been described where it is possible to automatically identify points of interest in one or more audio tracks of an audio recording—i.e., to identify, e.g., when a song ends. Then, at the one or more points of interest, it would be possible to insert artificial applause or other audience reaction effects.

The invention claimed is:

1. A method of post-processing an audio recording in an audio production equipment, comprising:
receiving at least one audio track of the audio recording,
analyzing one or more characteristics of the at least one audio track to identify a timing of one or more points of interest of a content of the at least one audio track,
adding, to the audio recording and at the timing of the one or more points of interest, one or more audience reaction effects;
detecting a first intensity of an audience reaction of the content of the at least one audio track;
generating the one or more audience reaction effects based on the audience reaction; and
adding the one or more audience reaction effects having a second intensity, the second intensity being larger than the first intensity.

2. The method of claim 1,
wherein the one or more points of interest of the content are associated with: end of song; end of solo performance; and artist-crowd interaction.

3. The method of claim 1, further comprising:
receiving, via a human-machine-interface, control data associated with the one or more audience reaction effects, and
adding the one or more audience reaction effects in accordance with the control data.

4. The method of claim 1, further comprising:
loading at least a part of the one or more audience reaction effects from a database.

5. The method of claim 1,
wherein the one or more characteristics are selected from the group comprising: dynamics of the content of the at least one audio track; contrast in audio level of the at least one audio track; contrast in spectral distribution of the at least one audio track; contrast in musical intensity of the content of the at least one audio track; contrast in musical tempo of the content of the at least one audio track; and/or key changes of the content of the at least one audio track.

6. The method of claim 1,
wherein the one or more characteristics of the at least one audio track are analyzed using a machine-learning algorithm.

7. The method of claim 1,
wherein the post-processing is performed in real-time.

8. The method of claim 1,
wherein the timing of the one or more points of interest is further identified based on a user-input received via a human-machine-interface.

9. The method of claim 1,
wherein the one or more audience reaction effects are selected from the group comprising: cheering; whistling; stadium ambience; club ambience; and applause.

10. The method of claim 1,
wherein the at least one track comprises a sum of multiple audio sources.

11. A method of post-processing an audio recording in an audio production equipment, comprising:
receiving at least one audio track of the audio recording,
analyzing one or more characteristics of the at least one audio track to identify a timing of one or more points of interest of a content of the at least one audio track,
adding, to the audio recording and at the timing of the one or more points of interest, one or more audience reaction effects
performing at least one of a pitch detection and a fricative detection on vocals of the content of the at least one audio track, and generating crowd singing in accordance with the at least one of the pitch detection and the fricative detection, to obtain the one or more audience reaction effects.

12. An audio production equipment comprising at least one processor and a memory, wherein the at least one processor is configured to load program code from the memory and to execute the program code, wherein the at least one processor is configured to perform, upon executing the program code:
- receive at least one audio track of the audio recording,
- analyze one or more characteristics of the at least one audio track to identify a timing of one or more points of interest of a content of the at least one audio track,
- add, to the audio recording and at the timing of the one or more points of interest, one or more audience reaction effects;
- detecting a first intensity of an audience reaction of the content of the at least one audio track;
- generating the one or more audience reaction effects based on the audience reaction; and
- adding the one or more audience reaction effects having a second intensity, the second intensity being larger than the first intensity.

13. The audio production equipment of claim 12, wherein the one or more points of interest of the content are associated with: end of song; end of solo performance; and artist-crowd interaction.

14. The audio production equipment of claim 12, the at least one processor configured to perform:
- receiving, via a human-machine-interface, control data associated with the one or more audience reaction effects, and
- adding the one or more audience reaction effects in accordance with the control data.

15. The audio production equipment of claim 12, the at least one processor configured to perform:
- loading at least a part of the one or more audience reaction effects from a database.

16. An audio production equipment comprising at least one processor and a memory, wherein the at least one processor is configured to load program code from the memory and to execute the program code, wherein the at least one processor is configured to perform, upon executing the program code:
- receive at least one audio track of the audio recording,
- analyze one or more characteristics of the at least one audio track to identify a timing of one or more points of interest of a content of the at least one audio track,
- add, to the audio recording and at the timing of the one or more points of interest, one or more audience reaction effects,
- perform at least one of a pitch detection and a fricative detection on vocals of the content of the at least one audio track, and
- generate crowd singing in accordance with the at least one of the pitch detection and the fricative detection, to obtain the one or more audience reaction effects.

* * * * *